INVENTORS
ANTHONY J. HORNFECK
AND HOWARD T. HOFFMAN
BY Raymond D Junkin
ATTORNEY INVENTORS
ANTHONY J. HORNFECK
AND HOWARD T. HOFFMAN
BY
Raymond W. Junkins
ATTORNEY INVENTORS
ANTHONY J. HORNFECK
AND HOWARD T. HOFFMAN
BY Raymond W. Jenkins
ATTORNEY INVENTORS
ANTHONY J. HORNFECK
AND HOWARD T. HOFFMAN
BY Raymond D. Jenkins
ATTORNEY Patented Apr. 29, 1952

2,594,436

UNITED STATES PATENT OFFICE 2,594,436

CONTROL SYSTEM

Anthony J. Hornfeck, Lyndhurst, and Howard T. Hoffman, Cleveland, Ohio, assignors to Bailey Meter Company, a corporation of Delaware Application October 8, 1948, Serial No. 53,448

17 Claims. (Cl. 318—28)

Our invention relates to a system for measuring and/or controlling the magnitude of a variable such as temperature, pressure, rate of fluid flow, position, or displacement, although the variable may be of any chemical, physical, electrical, thermal or other characteristic.

In accordance with our invention variations in a variable quantity, quality or condition are translated into variations in an electrical effect and this effect is then amplified solely through electrical or electronic means until sufficient power is available for doing useful work such as moving an indicator or other exhibiting means or for regulating the rate of application of an agent contributing to the production or maintenance of the variable.

In systems of the same general type at present known wherein variations in the variable are translated into variations in an electrical effect the necessary amplification is done at least in part by mechanical means. There are therefore variations in the magnitude of the variable translated into variations in an electrical effect which is then translated into a corresponding mechanical movement such as the deflection of a galvanometer and thence usually the mechanical movement is translated back to an electrical effect for operating the exhibiting or control device. Because of the small power available in the first electrical effect this device is usually operated on a periodic or step by step principle. That is to say upon a change in the variable the exhibiting or control device is not continuously operated in correspondence with such change or changes but periodically by means of a feeler mechanism an exhibiting or control device is changed an amount corresponding to the amount of change in the variable during succeeding increments of time. Such step by step and feeler mechanisms are well known in the art.

It is evident that such devices are necessarily complicated and delicate and do not correctly exhibit the variable during transient periods. Our invention is particularly concerned with the elimination of all mechanical movements between the sensitive device and the exhibiting or controlling device, leading to simplification and removal of the usual time delay, so that the device accurately exhibits the magnitude of the variable even during transient periods. It is evident that many ancillary advantages will follow, among which may be mentioned as obvious the elimination of wear of mechanical parts and the elimination of the necessity of periodic inspection and adjustments to correct for inaccuracies occasioned by mechanical wear.

The great majority of low level D.-C. measuring systems such as thermocouple-potentiometer recorders use a galvanometer for detecting or measuring the D.-C. input signals. The galvanometer is a relatively fragile device and is affected by mechanical vibration and is easily damaged by overload. Vacuum tube or electronic amplifiers for low D.-C. voltages have not been successful because of instability in tubes. A particular object of the present invention is to provide apparatus and a new method of detecting and amplifying small D.-C. voltages or current.

Systems have been devised for measuring small A.-C. signals utilizing the Wheatstone bridge and other types of electrical networks with phase sensitive amplifiers.

In measuring circuits of relatively small A.-C. or D.-C. signals representative of the variable quantity, quality or position to be measured it is usual to desire the indicating pointer, the recording pen, or the control pilot valve to be positioned by a reversing pilot motor. The requirements of the system is then to have a motor control circuit sensitive to the electrical signal which is representative of the variable or change in value of the variable. Such motor control circuit must include the necessary system and apparatus, sensitive to phase or polarity of the signal and for amplifying the same to selectively cause motor rotation in desired direction and degree depending upon the value of the variable or the departure of the variable from some predetermined or previous value.

A principal object of our present invention is to provide an electrical and electronic motor control circuit universal in nature in that the electrical sensing and amplifying network preceding the motor is without change sensitive to phase and magnitude of an A.-C. signal or to polarity and magnitude of a D.-C. signal.

Another object is to provide an electrical and electronic measuring system of motor control having an electronic inverter which is a phase discriminating amplifier receiving a small A.-C. signal and producing an amplified D.-C. output for motor control. In certain preferred embodiments of our invention we utilize a device which we term a reactor-converter which converts the D.-C. signal of varying potential into a greatly amplified A.-C. signal of reversible phase. If the D.-C. signal reverses in polarity a consequent reversal of phase is effected in the A.-C. signal. The apparatus includes a pair of iron core reactors and has all of the sensitivity of the galvanometer as well as the sturdiness of a transformer. There are no delicate moving mechanical parts to wear out or become damaged.

The reactor converter produces a greatly amplified A.-C. output signal of reversing phase which is supplied to a phase sensitive electronic amplifier and motor control circuit. In this way a thermocouple having an output of only a few millivolts is used to position a reversing motor with no intermediate mechanical or moving parts. The reversing motor may then position an indicator or recorder and at the same time a potentiometer for balancing the system which may be of the null type.

A particular object of our present invention lies in the amplifying and motor control circuit arrangement whereby increased sensitivity as well as an increased speed of rebalancing is accomplished without undue overtravel or hunting which in the past has almost invariably accompanied circuit arrangements which were primarily adapted for high speed operation.

Another object is the provision of a special cathode bias arrangement in connection with one or more thyratrons for control of the motor.

Figure 1:
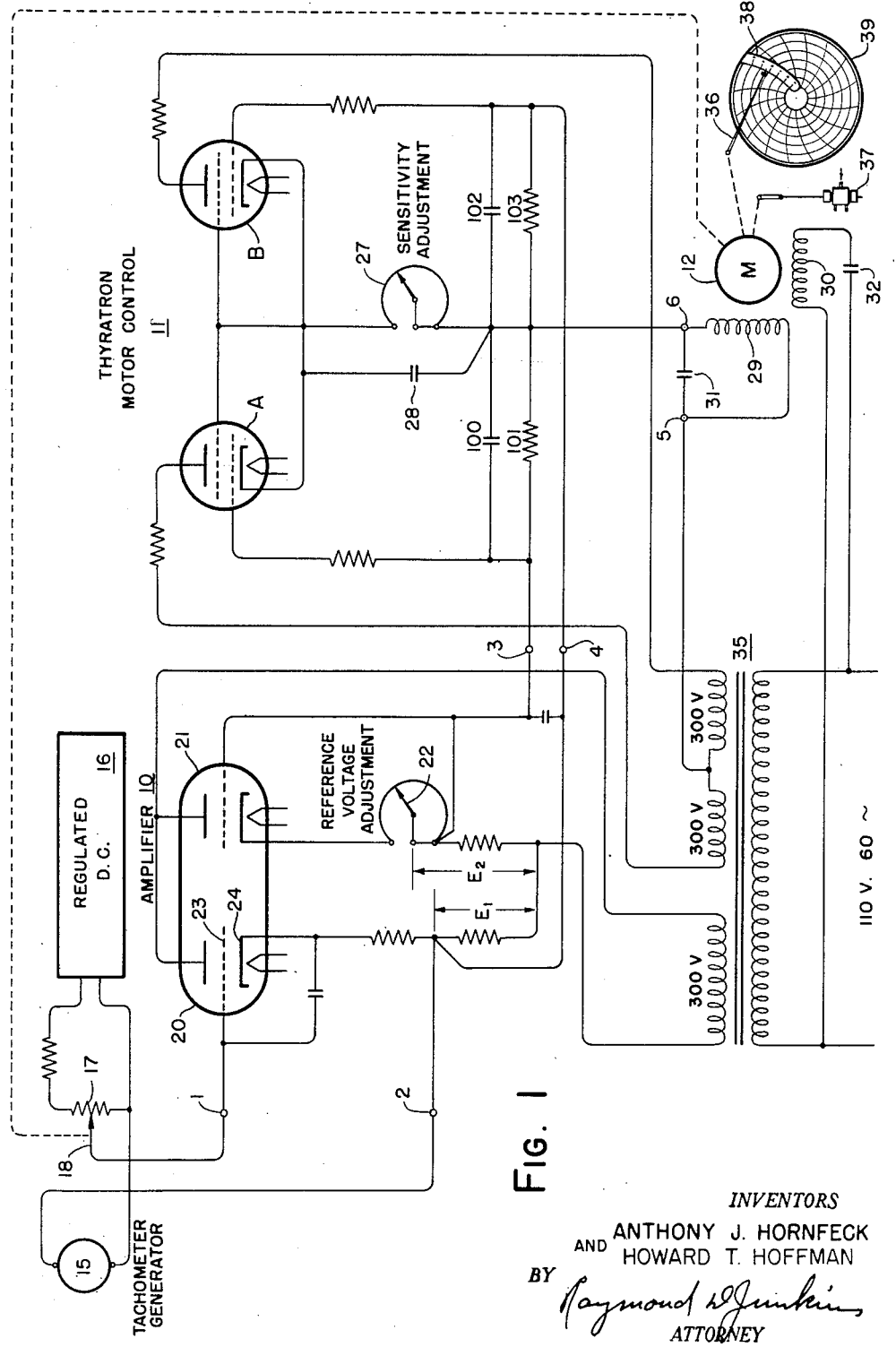
Fig. 1 is a schematic wiring diagram for the control of a reversing motor responsive to a low lever D.-C. signal.

Referring now specifically to Fig. 1 we show therein a complete wiring diagram for the measurement of speed of a tachometer generator as representative of speed of any rotating object which may be adapted to drive the tachometer generator. The principal components of the circuit include an amplifier 10 having input terminals 1, 2 and output terminals 3, 4, the latter comprising the input terminals of a thyratron motor control unit 11 having output terminals 5, 6 which comprise the input terminals of a reversing A.-C. motor 12 for positioning recording and controlling instrumentalities. A low level D.-C. signal of reversible polarity is impressed upon the terminals 1, 2 and the arrangement provides at the terminals 5, 6 a pulsating D.-C. output having a 60 cycle component of reversible phase and variable magnitude when an unbalance signal exists across terminals 1, 2 causing the motor 12 to rotate in desired direction and speed. When no signal appears at 1, 2 (balance) the 60 cycle component at 5, 6 is reduced to zero and no motor torque results.

In Fig. 1 a tachometer generator 15 is adapted to produce a low level D.-C. signal whose value is representative of rotational speed of the tachometer and thereby of whatever equipment is driving the tachometer. We provide a D.-C. potentiometer circuit including a portion of a resistance 17 which is supplied with regulated direct current from a source 16. An adjustable contact arm 18 is movable over the resistance 17 by the motor 12 for balancing the network. The previously mentioned terminals 1, 2 are connected in the loop including the elements 15 and 17 and when the D.-C. voltage generated by the tachometer 15 is equal to that existing across the included portion of the resistance 17 there will be no voltage impressed across the terminals 1, 2.

If, from a condition of balance, the tachometer speed increases with corresponding increase in D.-C. output a voltage will exist across the terminals 1, 2 of one polarity and of a magnitude depending upon the difference between the D.-C. voltage generated by 15 and the D.-C. voltage to which it is compared. If tachometer speed decreases then the voltage across 1, 2 will be of opposite polarity and again of a magnitude dependent upon the extent of unbalance. In general it may be said that the D.-C. signal across the terminals 1, 2 will be of a polarity determined by the direction of change of tachometer speed and of a magnitude determined by the extent of such change. The D.-C. signal is amplified and utilized to control directional speed of the motor 12 to position the arm 18 along the resistance 17 to bring the D.-C. potentiometer loop back into balance under which condition zero signal will exist across the terminals 1, 2.

The amplifier 10 is polarity sensitive to the signal at 1, 2 for producing at 3, 4 an amplified D.-C. voltage of reversible polarity. The device 10 is shown as a single envelope tube containing triodes 20 and 21; of which triode 21 is a rectifier supplying a reference voltage $E_2$ which is pulsating direct current resulting from half-wave rectification of the alternating current supply. The tube 10 is preferably such as a 6SN7, with grid controlled triodes, having a linear output voltage characteristic about evenly divided across the grid condition of zero impressed voltage. Manually adjustable contact 22 establishes the value of the reference voltage $E_2$ output of triode 21. The value of $E_2$ is established in desired relation to the value which $E_1$ will have under the condition of zero voltage across terminals 1, 2. In other words, under such condition, $E_2$ may be equal to $E_1$ or may be biased above or below $E_1$ through the agency of adjustable contact 22.

Triode 20 is polarity sensitive as to the voltage across 1, 2 for producing a voltage $E_1$ to be compared to the reference voltage $E_2$. Any voltage at 1, 2 is impressed between the grid 23 and cathode 24. When the circuit 15, 17, 18 is in balance and no voltage exists across the terminals 1, 2 the triode 20 will pass pulsating direct current resulting from half-wave rectification of the A.-C. supply. In the present embodiment we preferably adjust 22 so that $E_2$ is substantially equal to $E_1$ at a condition of zero voltage across 1, 2. This is the condition of greatest stability and allows approximately equal regulation in either direction from a zero voltage output across terminals 3, 4.

When the tachometer speed increases or decreases and the D.-C. potentiometer circuit becomes unbalanced a low level D.-C. voltage appears at 1, 2 and is applied to grid 23 of triode 20. If, for example, the tachometer speed has increased and a positive voltage appears at terminal 1 and grid 23 then there is an increase in plate current and an increase in voltage $E_1$. The difference in voltages $E_1 - E_2$ appears at terminals 3, 4 as a pulsating D.-C. voltage of one polarity and of a value determined by the extent of circuit unbalance.

When the tachometer speed decreases a voltage appears at terminals 1, 2 of which terminal 2 is positive and the plate current of triode 20 is decreased as is voltage $E_1$. The difference in voltages $E_2-E_1$ appears at 3, 4 as a D.-C. voltage of opposite polarity and of a value determined by the extent of unbalance as shown by the magnitude of the signal across 1, 2.

Thus the amplifier 10 receives a low level D.-C. signal of reversible polarity determined by the direction of unbalance of the D.-C. loop 15, 16, 17 and of a magnitude determined by the extent of such unbalance. The amplifier 10 is polarity sensitive and produces at terminals 3, 4 an amplified D.-C. voltage of polarity determined by polarity across 1, 2 and of a value varying relative to a reference value in accordance with magnitude of the signal at 1, 2.

The output at 3, 4, while of amplified voltage is at a relatively low current value, as supplied to the control grids of thyratrons A and B of the motor control circuit 11. With zero D.-C. signal across terminals 3, 4 the thyratrons A, B will have equal output of alternate half-waves and no rotation of the motor 12 will result. Rotation of the motor 12 occurs only when the power output of thyratrons A and B is unbalanced with the direction of power unbalance determining the direction of motor rotation.

The motor control circuit 11 includes two thyratron tubes A, B having their anodes energized by a split secondary winding of a transformer 35 and their cathodes connected through an adjustable resistance 27 and a condenser 28 arranged in parallel and through a motor winding 29 to the mid-tap on the transformer secondary. Equal resistors 101 and 103 complete the grid-cathode circuit of each thyratron by connecting their individual grids to the common cathode connection. The two circuits so completed by the resistors are then, as a unit, discriminatory between polarities of the input signal to terminals 3 and 4. Filtering capacitors 100 and 102 are placed in parallel with each of the resistors to smooth out the pulsations of the D.-C. voltage applied to the thyratron circuits. Another winding 30 of the motor 12 is energized directly from an A.-C. source. We term the elements 27, 28 a cathode bias and in Fig. 3 we show a rearrangement of certain portions of the circuit of Fig. 1 for ready study in connection with the graphs of Fig. 2.

Figure 2:
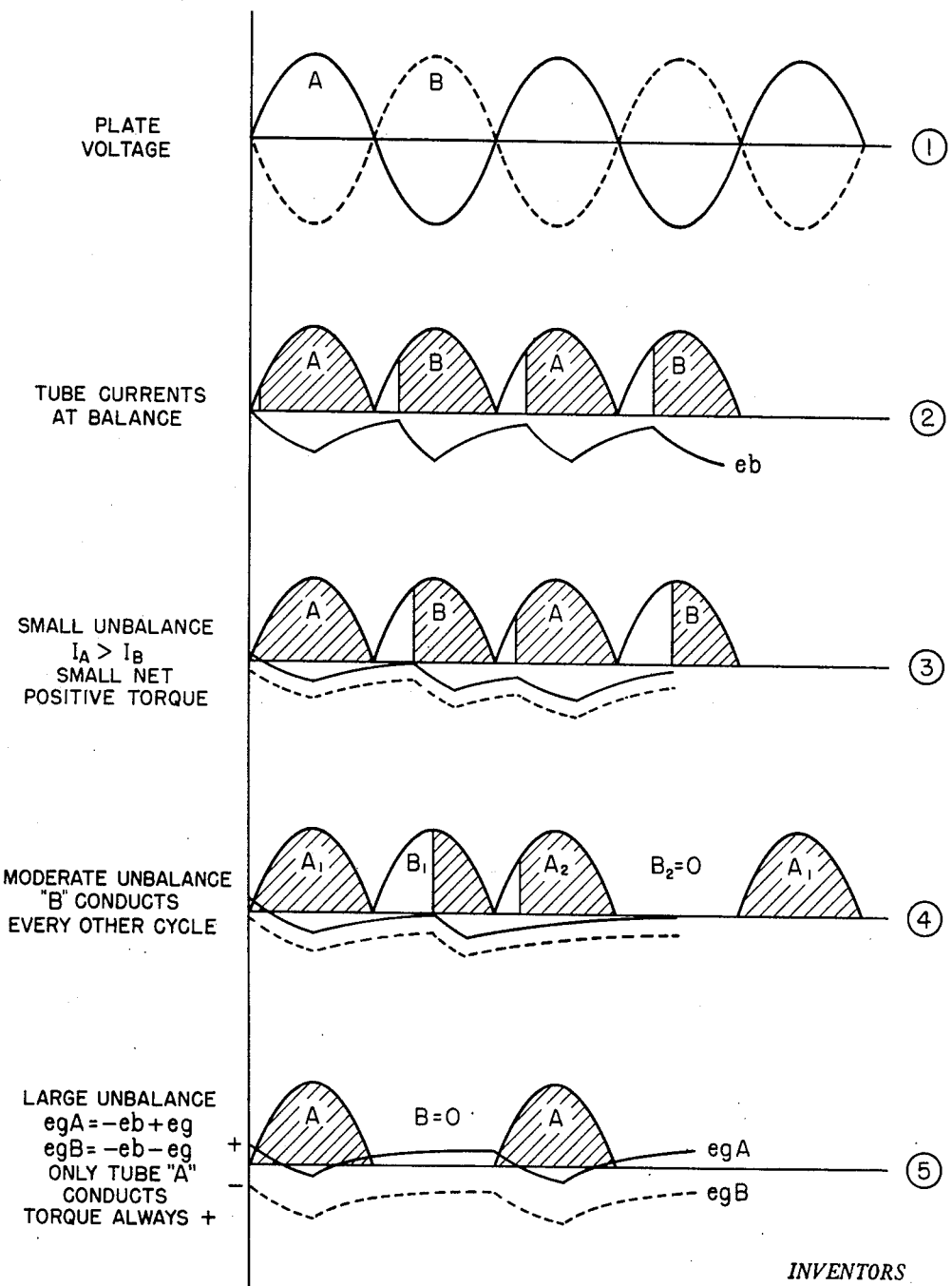
Fig. 2 is a family of graphs in connection with the improved amplifying and motor control circuit.

One of the thyratrons A or B is conductive during a half cycle when the output of the amplifier 10 at terminals 3, 4 is of one polarity and the other thyratron is conductive during a half cycle when the polarity at terminals 3, 4 is reversed; while at balance (with zero D.-C. signal across 3, 4) both thyratrons are firing over a portion of the positive half cycle of plate voltage (see graph "2," Fig. 2).

The connection of the resistance 27 and the capacitance 28 in parallel, in the output circuit of the thyratrons adjustably biases the grids and results in a negative voltage for combination with the grid voltage supplied to the thyratrons from terminals 3, 4. This negative voltage is not obtained until the thyratrons fire and it increases as the condenser 28 becomes charged. The condenser discharges partially between each half wave discharge of the tube and the voltage remaining across the condenser opposes the firing of the tube in the next half wave until the grid voltage supplied by the amplifier overcomes the condenser voltage. The point at which the tube fires in each cycle may be regulated by adjusting the resistance 27 and we term this a sensitivity adjustment. The bias can be adjusted so that each thyratron fires over a portion of the positive half cycle and only every other cycle or every third cycle. With this type of operation a definite quiver action is imparted to the rotor at balance.

The graphs of Fig. 2 show the output of the thyratrons A and B under different conditions of unbalance across terminals 1, 2 and resulting D.-C. voltage at terminals 3, 4. The voltage effective upon motor winding 29 is the algebraic summation of the shaded areas representing conduction of thyratrons A and B for the different conditions.

Graph "2" represents thyratron effect upon winding 29 for a condition of balance at terminals 1, 2 with a recurring pattern for each tube over three or four cycles and a net balance upon the motor winding resulting in no rotation.

Graphs "3," "4" and "5" represent thyratron output for various conditions of unbalance in one direction and signals of corresponding magnitude at terminals 3, 4 of one polarity. Similar graphs may be made for conditions resulting in motor rotation in opposite direction.

An unbalance of the measuring circuit will produce a grid signal on one thyratron to oppose the bias and on the other thyratron to aid the bias. A small signal will increase the average current conducted by one tube by increasing the period of conduction, and it will reduce the average current conducted by the other tube by reducing the period of conduction. (Graph "3".) Upon change in signal value the shaded areas will shift and in about three or four cycles will settle down to a relative value representative of the signal. The net algebraic summation of the shaded areas determines the speed of motor rotation. Graphs "3," "4" and "5" are all on the basis of tube A predominating and the same direction of rotation.

Graph "4" depicts a moderate unbalance with the average current passed by each thyratron modulated differentially from zero to maximum. Tube B conducts only every other cycle.

A large unbalanced signal (Graph "5") will cause one tube to fire over entire half cycle and completely extinguish the other tube. As the signal value increases, tube B conducts over fewer and fewer half cycles until finally the signal value increases to a magnitude where tube B is completely extinguished.

Motor torque is the result of the difference between the power output of the thyratrons A and B. At balance the outputs cancel out. For unbalance the direction of motor rotation is determined by whether the output of A or B is the greater and the speed of motor rotation is determined by the difference in thyratron output. For small signals of one polarity the output of A (for example) increases while that of B decreases and for larger signals of the same polarity B may actually decrease to zero while the reverse is true on the opposite polarity.

The modulation of the tube currents to obtain smooth control on the reversing motor is obtained by the design of the cathode bias circuit including elements 27 and 28. When zero voltage exists across terminals 3, 4 the output at terminals 5, 6 balances and the motor does not rotate. When an amplified D. C. voltage of one polarity exists across terminals 3, 4 then thyratron A (for example) will conduct in excess over thyratron B. The graphs of Fig. 2 illustrate, with reference to thyratrons A, B, the nature of the output across terminals 5, 6 in relation to the magnitude of the signal existing across terminals 1, 2. The result is to selectively supply a pulsating direct current having a 60 cycle component of reversible phase and variable magnitude to motor winding 29. The phase of this A. C. component and consequently the direction of motor rotation is determined by which tube predominates in its conduction. The motor winding is tuned by means of the parallel capacitor 31.

By means of the cathode bias 27, 28 on the thyratrons it is possible to obtain modulating control from a variable magnitude rather than variable phase grid voltage. The peculiar anticipatory action of the bias together with the damping effect of the relatively large D. C. motor winding current when both tubes conduct makes the system nearly dead-beat with .1% sensitivity. Furthermore, motor reversal is accomplished with grid signals as low as 10 millivolts on the thyratrons. There is of course the possibility of operating the thyratron motor control 11 directly from a measuring signal without additional amplifiers in cases where the available signal power is fairly large and is applied directly at the terminals 3, 4.

The motor 12 is an induction motor having a two-phase stator winding and a high resistance squirrel cage type rotor. There are two identical but separate windings 29, 30, the winding 30 being connected in series with a capacitor 32 across the A. C. power source so that its voltage leads the line voltage by nearly 90°. The capacitor 32 is chosen so that it is in resonance with the inductance of the winding 30 at the operating frequency and forms a series resonant circuit. This results in a voltage across the winding 30 which is approximately double the line voltage for the particular motor used.

The second winding 29, which we term the control winding, while identical with the first winding 30 in construction differs in that it has a capacitor 31 connected in parallel across it. The capacitor 31 is designed to produce a condition of parallel resonance at line frequence. It will be understood that while the drawing shows a 60 cycle power source the line frequency is not so limited to 60 cycles. At balance, some current flows through each half cycle of the applied potential across 5, 6.

It will be seen that the amplifier circuit 10 and motor control circuit 11 are substantially independent of each other to the extent that they may be supplied from alternating current sources of entirely different frequencies if desired. In other words the transformer 35 may be split into two transformers, one for the motor control and motor circuit which may be commercial 60 cycle frequency while a separate transformer for the amplifier circuit may be of a much higher frequency if desired (see Fig. 6).

In Fig. 1 the motor 12 is shown as simultaneously positioning the balancing contact 18, a recording pen 36 and a pneumatic pilot valve 37. The pen 36 is positionable relative to a visual index 38 and to a time revoluble chart 39. Pilot valve 37 may be of a type described in the patent to Johnson 2,074,696 whereby an air loading pressure is continually established useful in the control of the same variable which is responsible for changes in the signal across the terminals 1, 2 or in the control of another variable or variables which may or may not contribute to the value of the signal at terminals 1, 2.

In general the operation of the system so far described provides an indication and continuous record of the value of the variable, in this case speed, and establishes a control force representative of such value. In the particular example described it is desired to continuously ascertain the value of a speed of which the tachometer generator 15 output is representative and to utilize the control force either in the control of such speed or of another variable.

The D.-C. potentiometer loop is of the null balance type such that when speed is unchanging, regardless of its value, the potentiometer circuit is balanced and the signal across terminals 1, 2 is of zero voltage. Upon change in speed the loop becomes unbalanced and a signal at terminals 1, 2 provides a D.-C. voltage of one polarity or the other determined by the direction of unbalance (direction of speed change) and of a magnitude determined by the extent of such unbalance. The signal is impressed upon the amplifier 10 which is polarity sensitive and produces an amplified direct current at the terminals 3, 4 of polarity determined by the polarity of the signal and of a magnitude determined by the magnitude of the signal. The motor control circuit 11 normally produces a balanced condition as to the terminals 5, 6 so that the motor 12 does not rotate. If a signal of one polarity or the other exists across terminals 3, 4 then one thyratron or the other predominates to selectively control rotation of the motor 12 in desired direction whereby the recording pen 36 is moved from its previous speed value to the new speed value thus providing a continuous indication and record of the actual speed of the tachometer generator. At the same time the motor 12 positions the contact 18 along the resistance slidewire 17 in proper direction to rebalance the loop and return the signal at terminals 1, 2 to a zero value resulting in a cessation of movement of motor 12. In other words when the position of the pen 36, the pilot 37 and the contact 18 are representative of the speed of tachometer 15 the motor 12 is at rest and such overall condition persists until a change in tachometer speed occurs.

Figure 4:
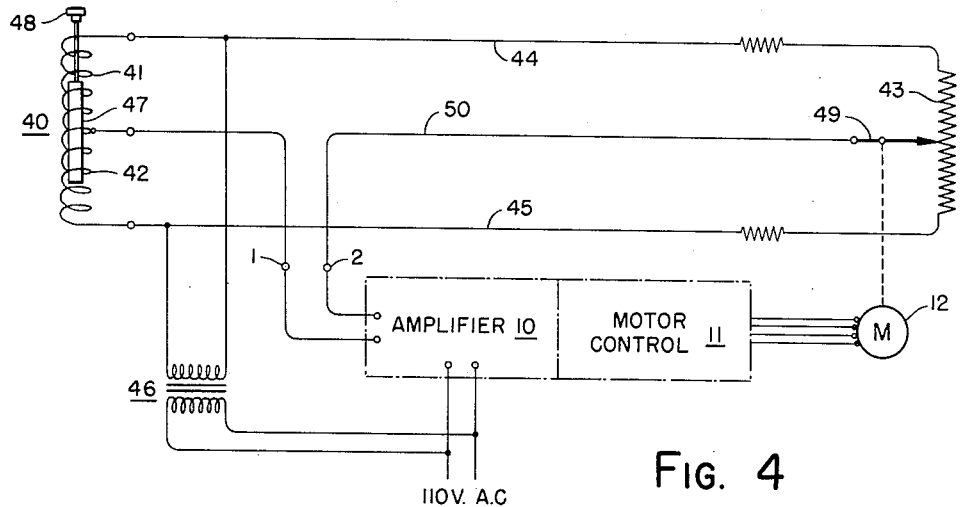
Fig. 4 is a simplified wiring diagram, based on Fig. 1 wherein the signal is a low level alternating current of reversible phase.

In Fig. 4 we illustrate an adaptation of our invention in the control of direction and speed of rotation of the motor 12 responsive to a signal at terminals 1, 2 which is of reversible phase alternating current. Thus it will be understood that we have provided a motor control system of universal type, i. e. responsive to either direct current or alternating current without change in its general arrangement. We illustrate herein diagrammatically the amplifier 10 and the motor control circuit 11 as being the same as those shown and described in detail in Fig. 1 except possibly for electrical values of the component parts.

For establishing a signal at terminals 1, 2 we have shown an A.-C. telemeter application of the null balance type. 40 indicates the transmitter of an induction bridge telemetering circuit having series connected windings 41, 42 connected in loop with a divisible slidewire resistance 43 by conductors 44, 45. The loop 41, 42, 43 and 44 is energized from an alternating current transformer 46. Positionable within the windings 41, 42 is a magnetic core piece 47 which may have a float or force movable member 48, the whole comprising a transmitter of the rotameter type. Such a meter is used in measuring the rate of flow of a fluid and variations in rate of flow cause a positioning of the elements 48, 47 to the end that the location of core 47 relative to the windings 41, 42 is continually representative of fluid rate of flow which is to be measured.

Positionable along the slidewire 43, through the agency of the motor 12, is a contact arm 49. The motor 12 may of course simultaneously position an indicating and recording pen and control instrumentality such as described in connection with Fig. 1.

A conductor 50 joins the movable contact arm 49 with a mid-tap of the windings 41, 42 to the end that the conductor 50 is susceptible to unbalance of the loop. When the system is in balance and the circuit 41, 44, 43, 49 and 50 has the same voltage condition as the circuit 42, 45, 43, 49 and 50 then no voltage exists across the terminals 1, 2. Under this balance condition the motor 12 is stationary and the slidewire 43 is then divided by the arm 49 in proper proportion, relative to the voltages and windings 41, 42, so that the two loops are in balance.

If fluid rate of flow increases (for example) and the elements 48, 47 move upwardly then the voltage in windings 41, 42 become unbalanced and a voltage of one phase appears across terminals 1, 2 with the result that motor 12 is energized for rotation in proper direction to position the contact arm 49 along the resistance 43 in a direction to rebalance the circuit. As soon as balance is attained through positioning of the arm 49 the signal at 1, 2 reduces to zero and the motor 12 stops. Thus any departure from balance of the measuring network results in an A.-C. signal across terminals 1, 2 of phase determined by the direction of unbalance and of a magnitude determined by the extent of unbalance. Such unbalance results in operation of the system and motor 12 to correct the unbalanced condition and return the system to balance.

Figure 3:
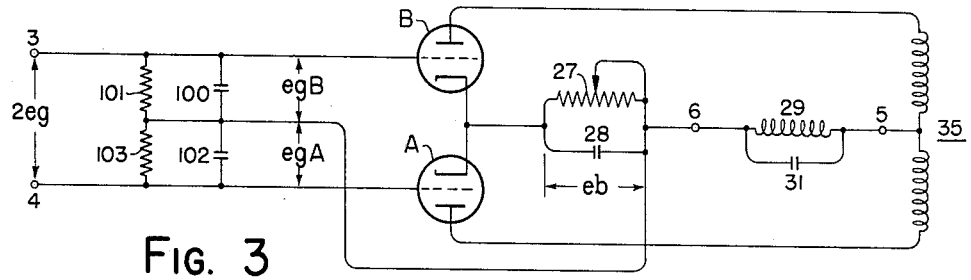
Fig. 3 is a simplified wiring diagram of a portion of Fig. 1.

It is believed unnecessary to go into greater detail as to the operation of circuits 10 and 11 upon occurrence of an A.-C. signal at terminals 1, 2 for the operation is substantially identical with that described in connection with Fig. 1. The triode 20 is responsive to either change in polarity or change in phase of a signal at terminals 1, 2. If the signal of Fig. 3 is of one phase it will be in phase with the plate current of triode 20 and tend to increase the voltage $E_1$. If the A.-C. signal at terminals 1, 2 is of opposite phase it will be out of phase with the plate current of triode 20 and tend to reduce the value of voltage $E_1$. Thus our improved motor control circuit comprising the elements 10 and 11 is equally as responsive to a D.-C. signal or to an A.-C. signal due to the triode 20 being either potential responsive or phase responsive.

We have found that this system is particularly satisfactory for A.-C. telemetering applications where the A.-C. circuit has a very poor null balance characteristic. The unit has the peculiar ability to select a 60 cycle in-phase component of the input signal and reject harmonics and out-of-phase unbalance which have a paralyzing effect on some types of amplifiers.

Figure 5:
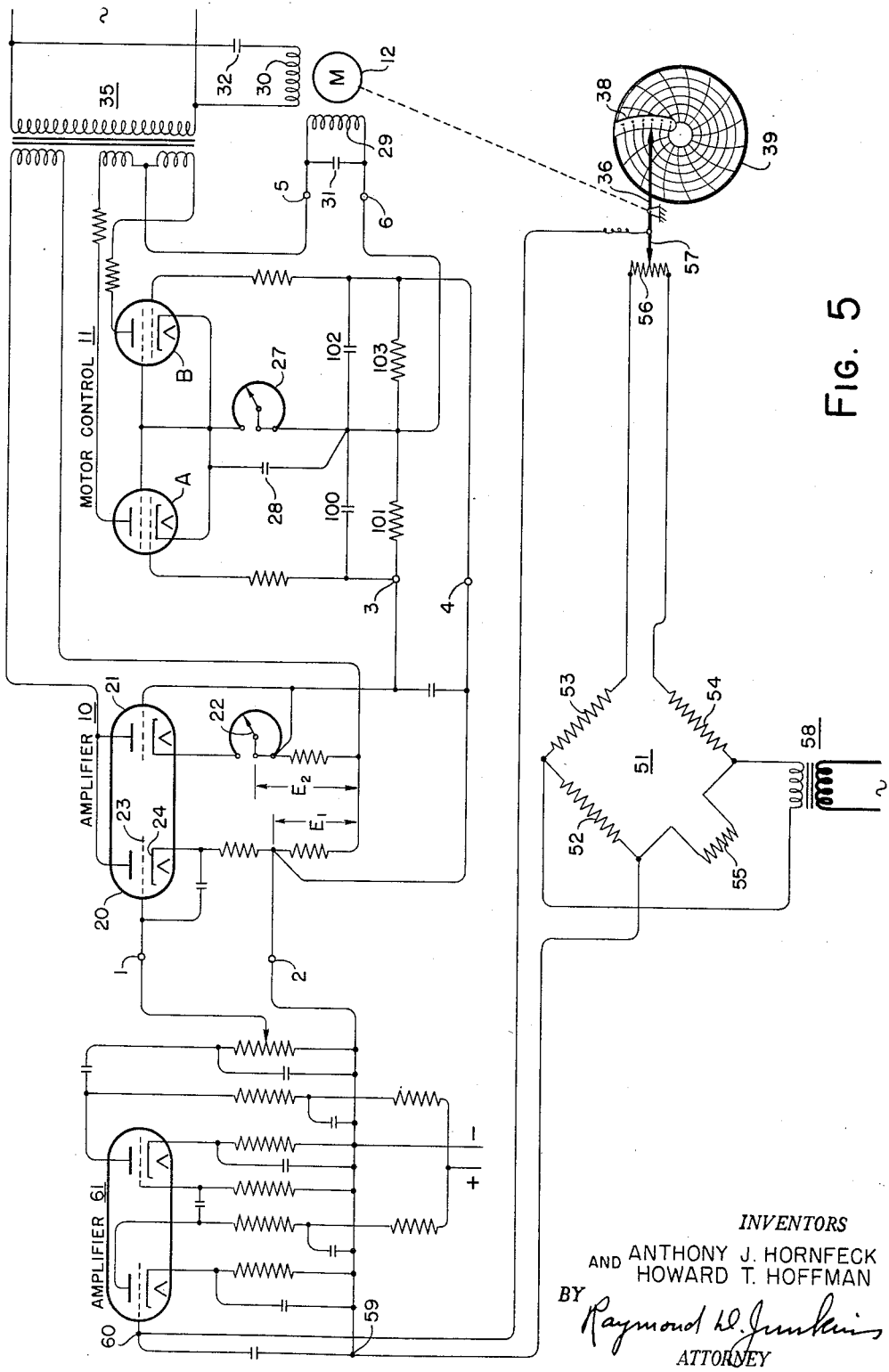
Fig. 5 is a schematic wiring diagram of a measuring circuit responsive to the A.-C. unbalance of a Wheatstone bridge utilized in temperature measurement.

In Fig. 5 we illustrate the adaptation of our invention to a temperature measuring system wherein the signal across 1, 2 originates with an A.-C. resistance thermometer bridge circuit having a very low A.-C. signal resulting from a very low temperature span. 51 is a phase sensitive alternating current bridge having fixed resistor arms 52, 53 and 54. The fourth arm 55 of the bridge 51 is a resistance element located at any desired location where temperature is to be measured. For balancing the network we provide an adjustable resistance 56 inserted between the arms 53 and 54 and provided with a movable contact arm 57 for proportioning the resistance 56 between the arms 53 and 54. The bridge 51 is supplied with alternating current through a transformer 58.

The motor 12 is adapted to position the arm 57 as well as the recording pen 36 to provide an indication of temperature as well as a continuous record of the value of temperature to which the resistance arm 55 is sensitive.

Preferably the bridge arm 55 is a platinum resistance measuring element and in the particular application is to be sensitive to a very low temperature span resulting in a very low A.-C. signal at terminals 59 and 60. For an understanding of a phase sensitive alternating current bridge for measuring the resistance of the leg 55 subjected to temperature to be measured reference may be had to the Ryder Patents 2,275,317 and 2,333,393. The conjugate voltage supplied to the terminals 59, 60 as an input to an amplifier 61 assumes a balance or unbalance and a phase relation relative to the supply voltage dependent upon the magnitude and sense of the unbalanced condition of the bridge 51. The amplifier 61 selectively provides an amplified A.-C. signal to the terminals 1, 2 and, as previously explained, the discriminator amplifier 10 is phase sensitive to the signal appearing at terminals 1, 2.

In general the system of Fig. 5 provides for the accurate measurement of extremely low temperature spans to which the resistance arm 55 may be subjected. The minute A.-C. signal of reversible phase appearing at terminals 59, 60 is amplified to produce at terminals 1, 2 an A.-C. signal of reversible phase of considerably greater value than that at terminals 59, 60 and of a phase determined by either increase or decrease in temperature at 55 and of a magnitude determined by the extent of change in temperature. The signal appearing at terminals 1, 2 results in a rotation of motor 12 in proper direction and amount to move the arm 57 over the slidewire 56 and rebalance the A.-C. network 51.

Figure 6:
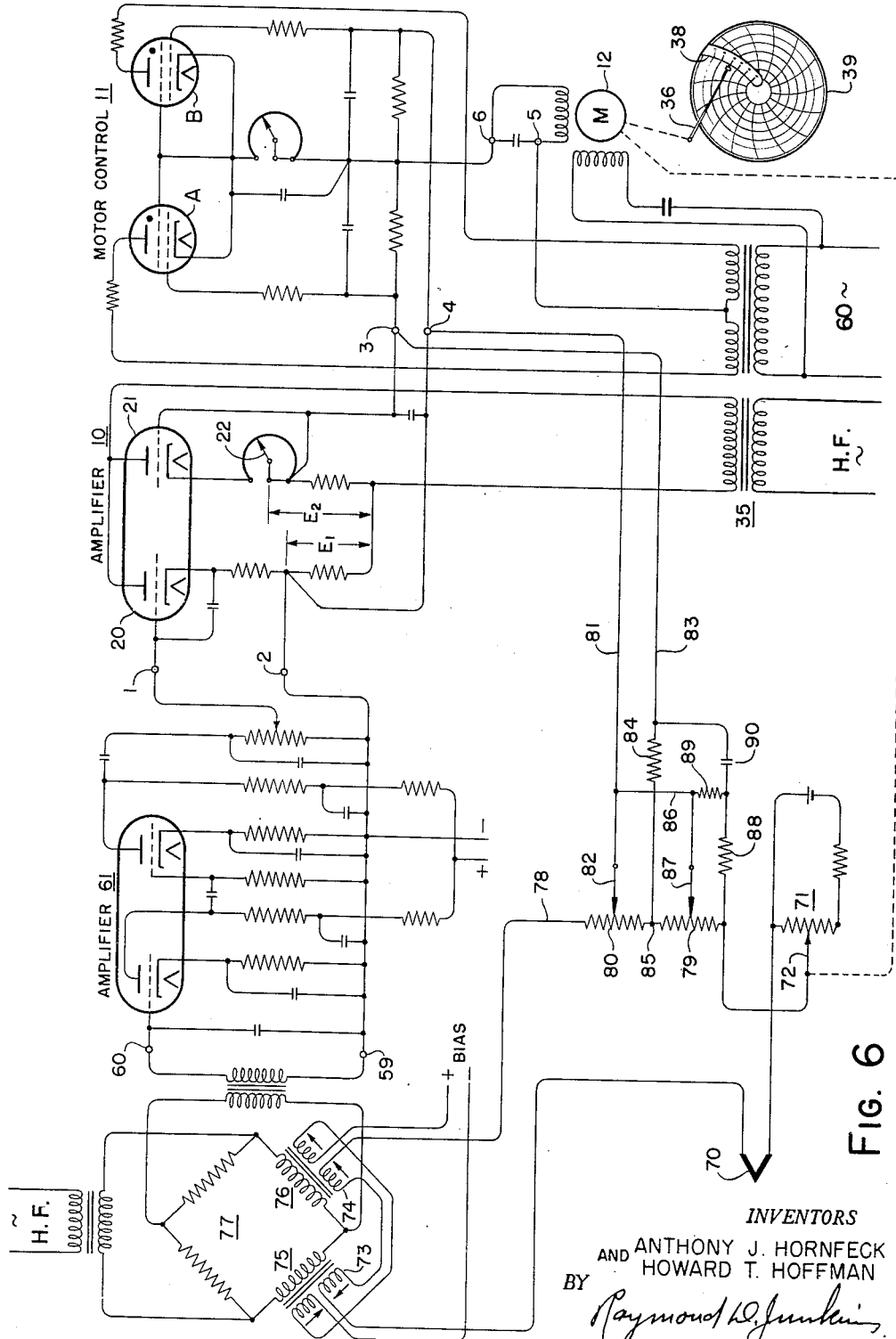
Fig. 6 is a circuit somewhat similar to Fig. 5 but utilizing a thermocouple in temperature measurement.

In Fig. 6 we illustrate the adaptation of our improved motor control circuit, in the measurement of temperature utilizing a thermocouple, for detecting small D.-C. voltages or currents. The present embodiment involves the use of a device (which we term a reactor converter) which converts the low D.-C. signal of reversing polarity into an amplified A.-C. signal of reversing phase. It includes a pair of iron core reactors and has all the sensitivity of a galvanometer as well as the sturdiness of a transformer. There are no delicate moving mechanical parts to wear out or to be damaged. Reference may be had to the application of Anthony J. Hornfeck, Serial No. 506,632, filed October 18, 1943, now Patent No. 2,494,876 granted January 17, 1950.

The reactor converter produces an amplified A.-C. output signal of reversing phase which is supplied to a phase sensitive electronic amplifier of the type mentioned at 61 in Fig. 5 for supplying to the terminals 1, 2 and A.-C. signal of reversible phase. In this way a thermocouple having an output of only a few millivolts D.-C. may be utilized to control the reversing motor 12.

A thermocouple 70 is sensitive to the temperature to be measured and is connected in a potentiometer system including the balancing potentiometer 71 having a movable contact arm 72 positionable by the motor 12. Unbalance signal of the potentiometer including elements 70, 71 and 72 is fed to windings 73, 74 of reactors 75, 76 in a bridge circuit 77. The output of the bridge 77 appears across terminals 59, 60 as an A.-C. voltage of reversible phase determined by the sense of unbalance of the potentiometer circuit and of a magnitude determined by the extent of unbalance. In general the action of the reactor converter is one of changing a D.-C. signal of given polarity into a greatly amplified A.-C. signal of given phase and the ability of reversing the phase of the alternating current signal 180° when the polarity or sign of the direct current signal is reversed. We have mentioned the amplifier 61 in connection with Fig. 4 and such amplifier may not be required between the terminals 59, 60 and the terminals 1, 2 at the input of the amplifier 10 and the motor control 11. In general the arrangement of Fig. 6 illustrates a thermocouple 70 producing low level D.-C. signals of reversing polarity and of varying magnitude dependent upon direction and extent of change of temperature to which the thermocouple 70 is sensitive from any previous temperature. Such change results in an unbalance of the potentiometer loop and the low level D.-C. voltage of reversing polarity is, through the agency of circuits 77 and 61 impressed at terminals 1, 2 as an amplified A.-C. signal of reversing phase which through the agency of the amplifier 10 and the motor control circuit 11 results in a rotation of motor 12 in proper direction and extent to cause the contact 72 to move over the slidewire 71 and rebalance the potentiometer circuit. Speed control of the motor 12 is dependent upon magnitude of the signal reaching the terminals 1, 2 and therefore determined by the extent of unbalance of the system 70, 71, 72.

In Fig. 6 we additionally show a feed-back arrangement tending to prevent overtravel and hunting. In the conductor 78 between the contact arm 72 and the reactor winding 74 we interpose two slidewire resistances 79 and 80. From the input terminal 4 we join a conductor 81 with a contact arm 82 adjustable over the resistance 80 and from the terminal 3 join a conductor 83, through a fixed resistance 84 to a terminal 85 which is the junction between resistance 79 and 80. The circuit 4, 81, 82, 80, 85, 84, 83 provides a feed-back of direct current from the output 3, 4 of the amplifier 10 to the input of network 77 and such feed-back is therefore proportional to the magnitude of the unbalance as represented at terminals 3, 4.

Also connected across the output terminals 3, 4 is a second feed-back which may be traced from terminal 4 through conductor 81, conductor 86, contact 87, slidewire 79, resistor 88, resistor 89, capacitor 90 and conductor 83 to terminal 3. This arrangement provides a separate feed-back proportional to the rate of change of the signal at terminals 3, 4.

The two feed-backs serve to minimize overtravel and hunting of the motor by modifying the demand for motor rotation originating with change in temperature to which the thermocouple 70 is sensitive.

Figure 7:
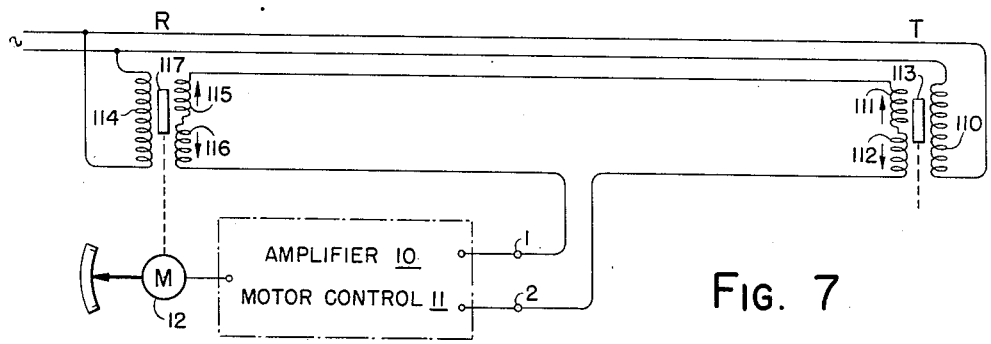
Fig. 7 is a schematic wiring diagram of a telemetering circuit.

In Fig. 7 we show the amplifier 10 and motor control 11 sensitive to unbalance of a telemetering system having a transmitter T and a receiver R which may be adjacent or spaced a considerable distance apart. The transmitter and receiver each comprise a movable core transformer included in a balancable loop circuit.

The transmitter T includes an alternating current energized primary winding 110 and a pair of opposed secondary windings 111 and 112. A movable core 113 may be positioned by any variable whose value is to be remotely indicated. The receiver is similarly provided with an energized primary 114 and a pair of opposed secondaries 115, 116 coupled by movable core 117. The secondary windings 111, 112, 115 and 116 are connected in a series loop across terminals 1, 2 of the motor control. The loop circuit receives current inductively from the primaries 110, 114 and if the inductive condition at T is the same as at R then the loop is balanced and no unbalance signal appears at 1, 2.

The transmitter core piece 113 may be positioned in either direction from a central location through the agency of a flow meter, Bourdon tube or similar device. In its neutral position the secondaries 111, 112 receive equal energization inductively from the primary 110 and cancel out. Movement of the core in one direction produces a voltage in winding 111 greater than that in 112 and vice versa. Similarly movement of the core 117 causes an unbalance of voltage between the windings 115 and 116.

From a condition of balance, with no voltage signal across the terminals 1, 2, a change in position of the variable actuated core 113 produces at the terminals 1, 2 a signal in direction and magnitude dependent upon the direction and extent of movement of the core 113. Such unbalance signal at the terminals 1, 2 results (as previously explained) in a rotation of the motor 12 in proper direction and extent to position the core 117 in such a direction as to balance the loop including the windings 111, 112, 115 and 116 and return the unbalance signal across the terminals 1, 2 to zero value.

Figure 8:
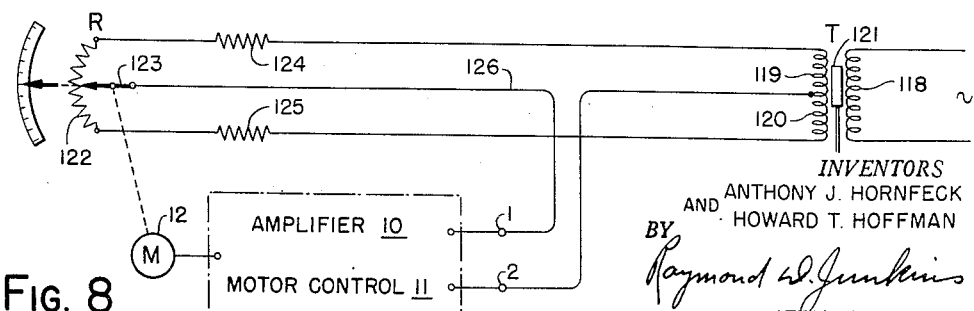
Fig. 8 is a schematic wiring diagram of another form of telemetering circuit.

In somewhat similar fashion we show in Fig. 8 a telemetering circuit having a transmitter T including an energized primary winding 118 coupled to a pair of secondary windings 119, 120 by means of a positionable core piece 121. At the receiver R we show a slidewire 122 having a movable contact arm 123 and connected in series circuit with fixed resistances 124, 125 and primaries 119, 120. A conjugate conductor 126 joins the contact arm 123 with a mid-tap of the secondaries 119, 120. The contact arm 123 is arranged to be positioned along the slidewire 122 through the agency of the motor 12.

When the system is in balance no signal appears across the terminals 1, 2. If the transmitter core 121 is moved from its previous position an unbalance of induced voltage exists in the windings 119, 120 producing a signal across the terminals 1, 2 of a sense and magnitude dependent upon the direction and extent of movement of the core 121 from its previous position. Such signal, at the terminals 1, 2, results in an actuation of the motor 12 to position the contact arm 123 along the slidewire 122 in proper direction and amount to return the circuit to balance and reduce the signal at terminals 1, 2 to zero.

While we have chosen to illustrate and describe certain preferred embodiments of our invention it will be understood that this is by way of example only and is not to be considered as limiting.

What we claim as new and desire to secure by Letters Patent of the United States, is:

1. A system for measuring the value of a variable comprising in combination, means actuated by said variable for establishing an electrical signal changeable in magnitude and relative direction representative of the value of said variable, a thermionic tube having an anode, cathode and grid, an impedance, a source of alternating current energizing a circuit comprising said anode, cathode and impedance, means applying said signal to the said grid-cathode to control the potential across said impedance, a source of potential on the order of that in said impedance, means to adjust said second potential to a desired value of that in the impedance when the said signal is zero, an output circuit combining said potentials in opposition to produce a D.-C. potential of reversing polarity, a pair of thyratrons having their anodes energized from opposite ends of a center-tapped secondary, a two-phase motor having a winding energized by alternating current and a second winding connected between the center tap and the cathodes of said thyratrons, a cathode resistor biasing said thyratrons to an intermediate output at zero control potential, means connecting the terminals of said output circuit respectively to the grids of said thyratrons to control the preponderance of output thereof, and an indicator actuated by said motor for movement over a scale.

2. The system defined in claim 1 in which the motor and thyratron output circuits are energized at a commercial frequency and the other circuits at a higher frequency.

3. A system for measuring a variable comprising in combination, means responsive to said variable to establish an electrical signal of magnitude and relative direction representative of the value of said variable, a thermionic tube having an anode, cathode and grid, an impedance, a source of alternating current energizing a circuit comprising said anode, cathode and impedance, means biasing said grid for anode current of substantially one-half maximum, means applying said signal to the said grid-cathode to change the potential across said impedance resulting from said one-half maximum current, a potential adjusted to a desired portion of the value of that in said impedance when the said signal is zero, an output circuit combining said potentials in opposition to produce an amplified D.-C. potential of reversible polarity, a pair of power tubes, a center-tapped secondary oppositely energizing the anodes of said power tubes, a two-phase motor having a winding energized by the same source as said secondary and a second winding connected between the center tap and the joined cathodes of said power tubes, means biasing said power tubes for substantially one-half maximum output, means connecting the terminals of said output circuit respectively to the grids of said power tubes to selectively regulate the output of each whereby the direction and speed of rotation of said motor is regulated, and variable-value designating means actuated by said motor.

4. A motor control system comprising in combination, a variable speed reversible motor having two windings, a pair of thyratrons having output circuits including anode and cathode elements, one set of like elements being connected together, a common source of alternating current for one of said windings and said thyratrons, cathode resistor means biasing the grids so that both thyratrons have some conductivity at zero control voltage for the grids, means so associating the output circuits, windings and source that the said thyratrons are energized at opposite polarities and one set of like elements are fed through the other motor winding whereby the direction of motor rotation depends on which thyratron has preponderant conductivity; a source of reversible direct current of varying magnitude associated with said grids to apply opposite potentials thereto and comprising a thermionic tube having an anode, cathode and grid, an impedance, a source of current energizing a circuit comprising said anode, cathode and impedance, means biasing said grid for substantially one-half maximum anode current, a potential adjusted substantially to the value of that in said impedance at zero grid control potential, an output circuit combining said potentials in opposition for application to the thyratron grids; and a source of grid potential for said tube variable in direction and magnitude whereby the value of potential in said impedance may be varied in each direction from that of the adjusted potential.

5. The system as defined in claim 4 in which the grid potential for said tube is provided by a tachometer generator and opposing potentiometer and in which said motor adjusts said potentiometer to balance the system.

6. The system as defined in claim 4 in which the said anode, cathode, impedance circuit is energized from a source of alternating current, said grid potential being of reversible phase resulting from a bridge circuit comprising a solenoid and a resistor parallel connected and energized from said A.-C. source, a slider on said resistor mechanically connected to be actuated by said motor, a midtap on said solenoid, said grid potential being taken from the slider and midtap, and a core movable in said solenoid and adapted to be positioned by a variable to one or the other side of the center thereof.

7. The system as defined in claim 4 in which the said anode, cathode, impedance circuit is energized from a source of alternating current, said grid potential being of reversible phase resulting from a resistance thermometer, a bridge energized from the same source of alternating current and including a thermometric resistance, a balancing resistor for said bridge having a slider, one conjugate conductor of said bridge being connected to said slider and an opposite point in the bridge to produce an A.-C. output of reversing phase and variable magnitude, said motor being mechanically connected to said slider to balance the bridge, and an amplifier energized by direct current adapted to amplify the said A.-C. output and apply it to the grid of said tube.

8. The system as defined in claim 4 in which the said anode, cathode, impedance circuit is energized from a source of alternating current, said grid potential being of reversible phase resulting from a reactor-converter comprising a pair of saturable core reactors each having an A.-C. winding and a pair of impedances forming a bridge having one conjugate energized from said source and the remaining conjugate supplying said grid potential, each reactor having a bias winding and a signal winding, a source of direct current energizing said bias windings and a D.-C. signal of reversible polarity so supplied to the signal windings as to oppose the bias of one reactor and aid that of the other dependent on the direction of the signal voltage.

9. The system as defined in claim 8 in which the source of the D.-C. signal of reversible polarity comprises a thermocouple and a battery energized potentiometer arranged in opposition, a slider on said potentiometer and a mechanical connection between the motor and slider to balance the circuit.

10. The system as defined in claim 8 in which the source of the D.-C. signal of reversible polarity comprises a thermocouple and a battery energized potentiometer arranged in opposition, a circuit delivering the unbalance voltage of said potentiometer and thermocouple to said signal winding, a network associated with said last mention circuit and means conductively associating said network and the reversible D.-C. potential applied to the thyratron grids so arranged as to provide a reverse feedback to the signal windings on said saturable core reactors.

11. The system as defined in claim 8 in which the source of the D.-C. signal of reversible polarity comprises a thermocouple and a battery energized potentiometer arranged in opposition, a circuit delivering the unbalance voltage of said potentiometer and thermocouple to said signal winding, a network associated with said last mentioned circuit, means conductively associating said network and the reversible D.-C. potential applied to the thyratron grids so arranged as to provide a reverse feedback to the signal windings on said saturable core reactors so as to prevent overtravel and hunting of said motor, a slider on said potentiometer, a mechanical connection between said motor and slider to balance the system and an indicator actuated by said motor for movement over a temperature chart to designate the temperature to which the thermocouple is exposed.

12. The system as defined in claim 8 in which the source of the D.-C. signal of reversible polarity comprises a thermocouple and a battery energized potentiometer arranged in opposition, a circuit delivering the unbalance voltage of said potentiometer and thermocouple to said signal winding, a network associated with said last mentioned circuit and including resistors in series therein, a feedback circuit between said resistors and the source of reversible D.-C. potential applied to the thyratron grids, resistors and condensers in said network in series in said feedback circuit, the whole being arranged to provide feedback voltage proportional to the magnitude of the unbalance and proportional to the rate of change of unbalance as represented at said thyratron grids to prevent overtravel and hunting of said motor, a slider on said potentiometer and a mechanical connection between said motor and slider to balance the system for any instantaneous temperature to which the thermocouple is subjected.

13. A motor control system comprising in combination, a two-phase motor having an A.-C. energized winding and a second winding; a pair of thyratrons, a transformer energized from the same alternating current and having a secondary with opposite ends connected respectively to the anodes of said thyratrons, a midtap on said secondary connected through said second winding to the cathodes of said thyratrons, means biasing the thyratron grids for partial conductivity at zero grid control voltage; a source of reversible direct current of variable magnitude connected to apply opposite control polarity to said grids and comprising a tube having anode, cathode and grid, an impedance, a source of alternating current energizing a circuit comprising said anode, cathode and impedance, means biasing said grid for anode current flow of average value, a second tube having an impedance in its anode-cathode circuit, said last mentioned circuit being energized in parallel to the first, means adjusting the potential across said second impedance to substantially equal that across the first at zero grid control potential for the first tube, an output circuit combining said potentials in opposition for said thyratron grid control; a source of A.-C. grid potential for said first tube of reversible phase and variable magnitude and means responsive to a variable to provide said last mentioned potential representative of the value of said variable.

14. The system as claimed in claim 13 in which the source of A.-C. grid control potential for the first tube comprises a transmitter having an A.-C. energized primary winding and a pair of series connected secondary windings inductively energized from said primary, a magnetic core piece coupling said windings variably in dependence upon the value of a variable, a receiver having a resistor connected in series with the secondaries and a slider, a circuit between said slider and the connection between said secondaries for supplying said A.-C. grid control potential and a mechanical connection between the said slider and motor to rebalance the system after a change in the value of the variable.

15. The system as defined in claim 13 in which the source of A.-C. grid control potential for the first tube comprises a primary and a secondary circuit, a conductor common to said circuits, a coil in each circuit at each of a first and a second location, means magnetically coupling said coils at said locations, a source of alternating current energizing the primary circuit, said grid control potential being developed in the remaining conductor of the secondary circuit, said coupling means comprising a core movable at each location, means to move the core at the first location in response to changes in a variable and means actuated by said motor to adjust the other core to balance the system after each change in value of said variable.

16. The system as defined in claim 13 in which the frequency of the alternating current for the motor and thyratron power circuits is independent of the frequency of the alternating current used to energize the remainder of the circuit.

17. A motor control system comprising in combination, a variable speed reversible two phase motor having two windings one energized directly from an A.-C. source, a pair of thyratrons each having anode, cathode and grid, a transformer energized from said source and having a secondary with opposite ends connected respectively to the said anodes, a mid tap on said secondary connected to one end of the other motor winding, a biasing resistor and condenser connected in parallel and between the remaining end of said other winding and both the said cathodes, said resistor being adjusted to provide partial conductivity for the thyratron at zero grid control voltage, a resistor connecting each grid to the motor winding end of said biasing resistor-condenser and a source of reversible direct current of variable magnitude connected to apply opposite control polarities to said grids at any one time, said condenser having such a capacity as to maintain a conducting bias on the grids under all conditions of cathode load.

ANTHONY J. HORNFECK.
HOWARD T. HOFFMAN.

(References on following page)

REFERENCES CITED

The following references are of record in the file of this patent:

UNITED STATES PATENTS

| Number | Name | Date |
|---|---|---|
| 2,109,222 | Ryder | Feb. 22, 1938 |
| 2,276,506 | Moore | Mar. 17, 1942 |
| 2,310,955 | Hornfeck | Feb. 16, 1943 |
| 2,333,393 | Ryder | Nov. 2, 1943 |
| 2,355,537 | Jones | Aug. 8, 1944 |
| 2,363,473 | Ryder | Nov. 21, 1944 |
| 2,436,807 | Isbister | Mar. 2, 1948 |
| 2,447,338 | Hornfeck | Aug. 17, 1948 |
| 2,494,876 | Hornfeck | Jan. 17, 1950 |